US006178939B1

(12) United States Patent
Powell

(10) Patent No.: US 6,178,939 B1
(45) Date of Patent: Jan. 30, 2001

(54) HOUSING SYSTEM

(75) Inventor: Jeffrey Joseph Powell, Windsor (CA)

(73) Assignee: Siemens Canada Limited, Windsor (CA)

(*) Notice: Under 35 U.S.C. 154(b), the term of this patent shall be extended for 0 days.

(21) Appl. No.: 09/335,664

(22) Filed: Jun. 18, 1999

Related U.S. Application Data

(60) Provisional application No. 60/090,513, filed on Jun. 24, 1998.

(51) Int. Cl.[7] .................................................... B01D 46/10
(52) U.S. Cl. ...................................... 123/184.21; 181/204
(58) Field of Search ........................... 123/184.21, 198 E, 123/195 C, 41.49, 564; 181/204

(56) References Cited

U.S. PATENT DOCUMENTS

| | | | | |
|---|---|---|---|---|
| 4,086,976 | * | 5/1978 | Holm et al. | 123/41.49 |
| 4,141,334 | * | 2/1979 | Hatz et al. | 123/198 E |
| 4,480,608 | * | 11/1984 | Valev | 123/195 C |
| 4,582,030 | | 4/1986 | Reese . | |
| 4,783,207 | * | 11/1988 | Nagashima et al. | 123/198 E |
| 5,448,982 | | 9/1995 | Arakawa . | |
| 5,613,478 | * | 3/1997 | Widmann | 123/564 |
| 5,706,790 | * | 1/1998 | Kemmler et al. | 123/564 |

FOREIGN PATENT DOCUMENTS

| | | |
|---|---|---|
| 05001566 | 1/1993 | (JP) . |
| 06042420 | 2/1994 | (JP) . |
| 10169522 | 6/1998 | (JP) . |

* cited by examiner

*Primary Examiner*—Marguerite McMahon

(57) ABSTRACT

A housing for abating noise and receiving an air cleaner is disclosed. The housing is configured for separable coupling to an internal combustion engine of an automobile. The engine includes a plurality of belt driven accessories driven by a crankshaft. The housing includes an internal air cavity disposed in the housing. The cavity provides an air induction chamber adjacent an intake for inducing air into the air induction chamber from an external source and a filtering chamber adjacent an air discharge for venting air from the filtering chamber. The filtering chamber is configured to receive a filter for purifying air disposed intermediate the intake and the discharge. The engine further includes a shroud integral with the exterior of the housing. The shroud provides a peripheral wall defining a recess configured to at least partially surround at least a portion of at least two belt driven accessories. The shroud substantially reduces noise generated by the engine.

20 Claims, 4 Drawing Sheets

HOUSING SYSTEM

This application claims benefit to provisional application No. 60/090513 filed Jun. 24, 1998.

FIELD OF THE INVENTION

The present invention relates generally to abating engine noise and providing an air purification unit associated with the engine of a motor vehicle. In particular, the present invention relates to a housing system configured to substantially reduce the noise generated by an automobile engine and provide a housing configured to receive an air filter.

BACKGROUND OF THE INVENTION

It is well known to purify raw air before routing the air and fuel through a manifold and supplying the air and fuel to a cylinder head of an internal combustion engine. Such known air cleaners typically include a filter disposed in a container. In operation, such known air cleaners provide for the intake of raw air, the purification of the raw air and the routing of purified air to the manifold. Such known manifolds provide for the routing of the purified air and the fuel to the cylinder head of the engine.

It is also well known to reduce the amount of noise generated by an automobile and its associated components. For example, a muffler may be connected to an engine exhaust to reduce the noise generated by the ignition of the fuel and the air in the engine. In addition, it is known to provide sound absorbing materials under the hood of an automobile and in the driver compartment of the automobile to reduce the amount of engine and ambient noise perceptible to the driver.

A problem with such known air cleaners and their containers is that they are not typically configured to reduce engine noise or noise generated by belt driven engine accessories. Further, such containers typically have a single purpose (i.e., containing the air cleaner) and are not easily accessible for servicing of the air cleaner.

What is needed, therefore, is a housing system configured to receive an air cleaner and reduce the amount of noise generated by an engine and its associated belt driven accessories. It would also be advantageous to have a housing system onto which cavity accessories and mechanical accessories may be secured. It would further be advantageous to have a housing system that is capable of cooling such accessories. It would also be advantageous to provide a housing system of simple structure that occupies the unused underhood space of an automobile.

SUMMARY OF THE PRESENT INVENTION

The present invention relates to a housing for abating noise and receiving an air cleaner. The housing is configured for separable coupling to an internal combustion engine of an automobile. The engine includes a plurality of belt driven accessories driven by a crankshaft. The housing includes an internal air cavity disposed in the housing. The cavity provides an air induction chamber adjacent an intake for inducing air into the air induction chamber from an external source and a filtering chamber adjacent an air discharge for venting air from the filtering chamber. The filtering chamber is configured to receive a filter for purifying air disposed intermediate the intake and the discharge. The engine further includes a shroud integral with the exterior of the housing. The shroud provides a peripheral wall defining a recess configured to at least partially surround at least a portion of at least two belt driven accessories. The shroud substantially reduces noise generated by the engine.

The present invention further relates to an automotive power supply system. The system includes an internal combustion engine. The engine includes a throttle valve for regulating the amount of air provided to a valve cover. The throttle valve includes a throttle intake, a throttle discharge and a throttle plate disposed between the throttle intake and the throttle discharge. The throttle discharge is intermediate the throttle intake and the valve cover. The engine also includes a manifold for providing air from the throttle valve to the valve cover. The engine also includes a hollow elongate member for venting air from the valve cover to the throttle valve disposed between the valve cover and a filter for purifying air. The engine also includes a common fuel source for providing fuel to the manifold coupled to the manifold. The engine also includes a radiator for cooling the engine coupled to the engine. The engine also includes a plurality of belt driven accessories coupled to the engine and driven by a crankshaft.

The system also includes a housing for abating engine noise and receiving the filter. The housing is mounted to the engine and includes an internal air cavity disposed in the housing. The cavity provides an air induction chamber adjacent an air intake for inducing air into the air induction chamber from an external source, and a filtering chamber adjacent an air discharge for venting air from the filtering chamber. The filter is disposed in the filtering chamber intermediate the air intake and the air discharge. The system also includes a shroud integral with the exterior of the housing. The shroud provides a peripheral wall defining a recess at least partially surrounding at least a portion of at least two of the belt driven accessories of the plurality of belt driven accessories. The shroud substantially reduces noise generated by the engine and the air discharge of the air induction chamber is fluidly coupled to the throttle valve.

It is an object of this invention to provide a housing system configured to receive an air cleaner and reduce the amount of noise generated by an engine and its associated belt driven accessories. It is a further object of this invention to have a housing system onto which cavity accessories and mechanical accessories may be secured. It is a further object of this invention to have a housing system that is capable of cooling such accessories. It is a further object of this invention to have a housing system of simple structure that occupies the unused underhood space of an automobile.

Other principal features and advantages of the invention will become apparent to those skilled in the art upon review of the following drawings, the detailed description and the appended claims.

DETAILED DESCRIPTION OF THE PREFERRED EMBODIMENTS

Figure 1:
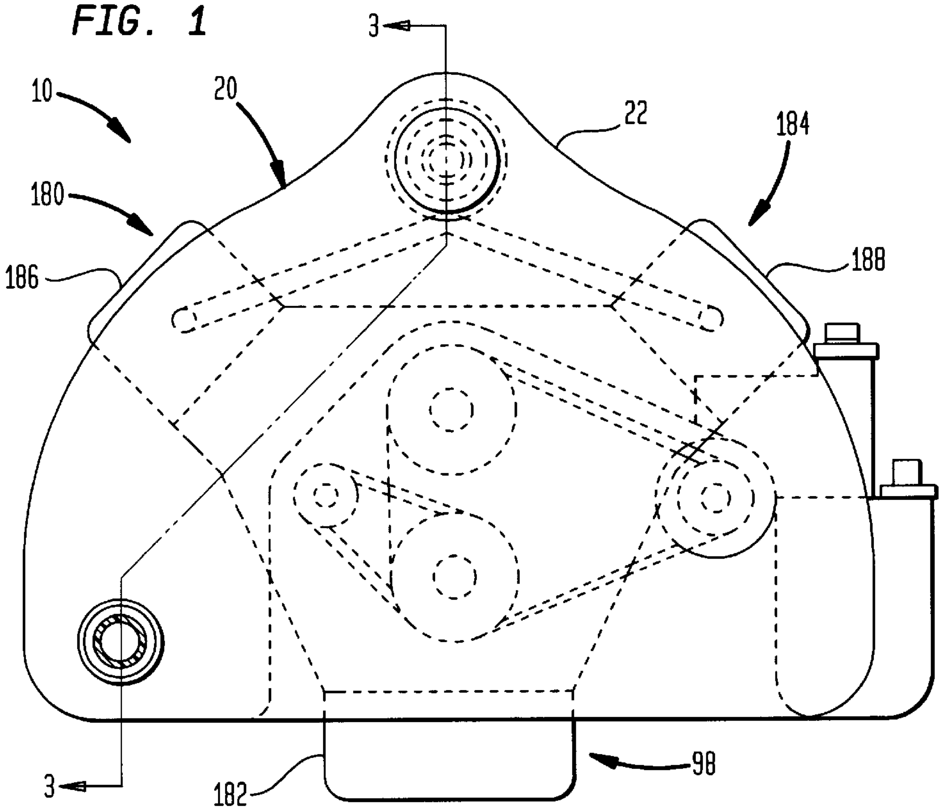
FIG. 1 is a front elevation view of the housing system in accordance with a preferred embodiment of the present invention.

FIG. 1 shows a housing system 10 for reducing engine noise and receiving a filter assembly 40 according to a preferred embodiment of the present invention. System 10 includes a housing 20 mounted to an engine block 182 of a vehicular internal combustion engine 98. Housing 20 includes an air reservoir (shown as a cavity 24) and an external cavity (shown as a recess 34). Filter assembly 40 is disposed between an air intake 66 of housing 20 and a throttle assembly 130. In operation, raw air 62 (e.g., atmospheric, ambient, unpurified, dirty air, etc.) enters intake 66 and is directed through cavity 24. Raw air 62 is then filtered by filter assembly 40 and exits cavity 24 through a discharge (e.g., outlet, vent, exhaust, etc. shown as an aperture 128) of housing 20. Purified air 48 is then regulated or throttled by throttle assembly 130 and is directed to a valve cover 186 of engine 98.

Figure 3:
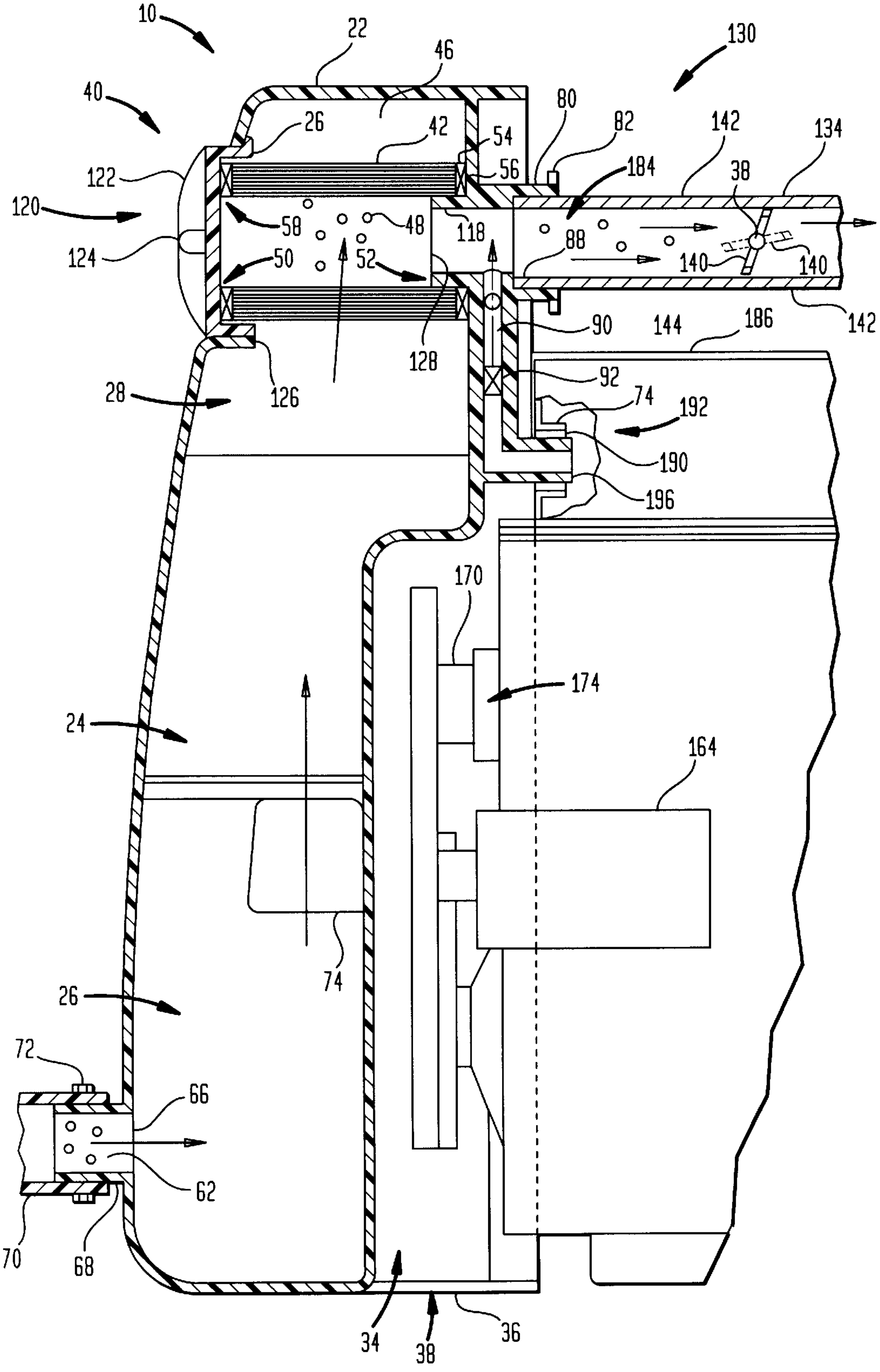
FIG. 3 is a fragmentary cross sectional view of the system of FIG. 1 along line 1—1 of FIG. 1.

Referring to FIG. 3, an exterior wall 22 defines cavity 24 of housing 20. Cavity 24 includes a dirty air chamber 26 and an air filtering chamber 28. A raw air inlet 68 is integral with wall 22 and projects outwardly from the front housing 20. As best shown in FIG. 1, inlet 68 is positioned off center from the front of housing 20. A fastener (shown as a capture clamp 72) connects an extension tube 70 to inlet 68. Extension tube 70 provides raw air 62 from a raw air source (not shown) such as the atmosphere. Raw air 62 that is induced into dirty air chamber 26 is directed toward filtering chamber 28 for purification or filtering by filter assembly 40.

Figure 2:
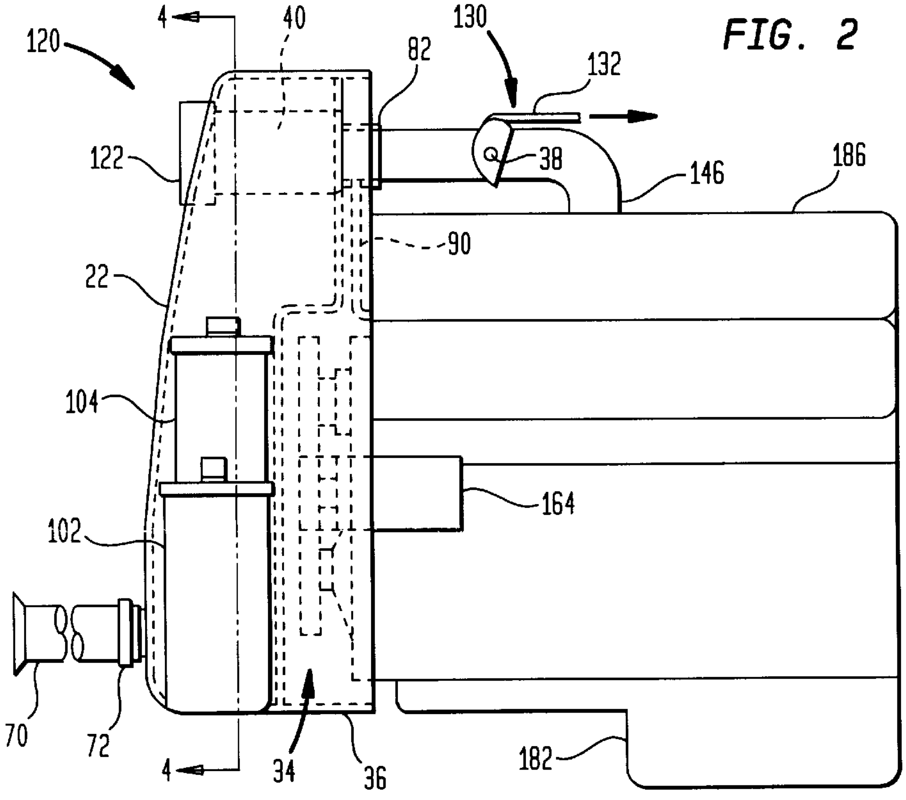
FIG. 2 is side elevation view of the system of FIG. 1.

Referring to FIG. 2, the exterior of housing 20 includes recess 34 surrounding belt driven accessories 150 mounted to the front of engine block 182. Recess 34 is defined by a peripheral wall 36 of a shroud 38. Wall 36 partially circumscribes and surrounds belt driven accessories 150 to partially enclose a belt system 148 and belt driven accessories 150 within recess 34. Recess 34 is in close proximity to belt system 148 and belt driven accessories 150. Each belt driven accessory 150 includes a pulley or wheel 168 connected by a rod 170 to a base 174, such that wheel 168 is rotated when rod 170 is rotated. Belt system 148 interconnects belt driven accessories 150. A serpentine or drive belt 152 interconnects wheel 168 of a crank 160 driven by a crankshaft (not shown) to wheel 168 of a water pump 162 and wheel 168 of an alternator 164. As wheel 168 of crank 160 is rotated, drive belt 156 causes wheel 168 of water pump 162 and alternator 164 to likewise rotate. A tensioning belt 158 for removing slack in drive belt 156 interconnects wheel 168 of a tensioning device (shown as an idler 166) to wheel 168 of crank 160.

Figure 4:
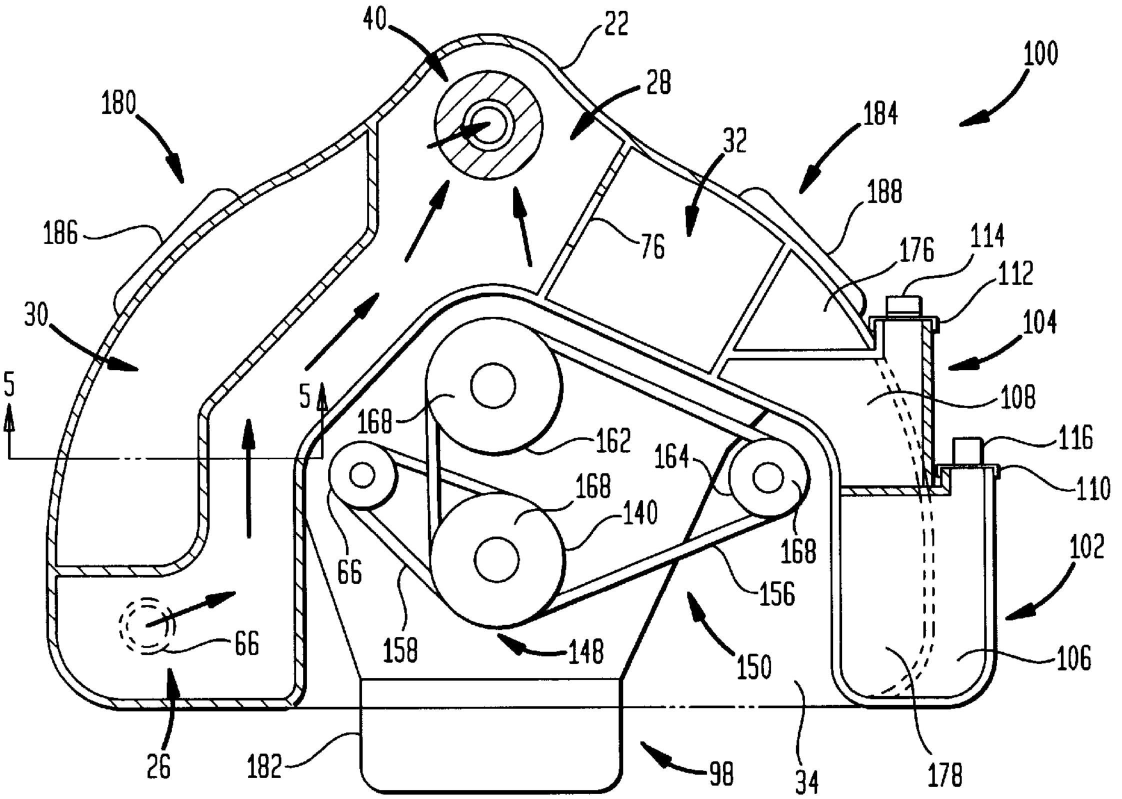
FIG. 4 is a cross sectional view of the system of FIG. 1 along line 4—4 of FIG. 2.
Figure 5:
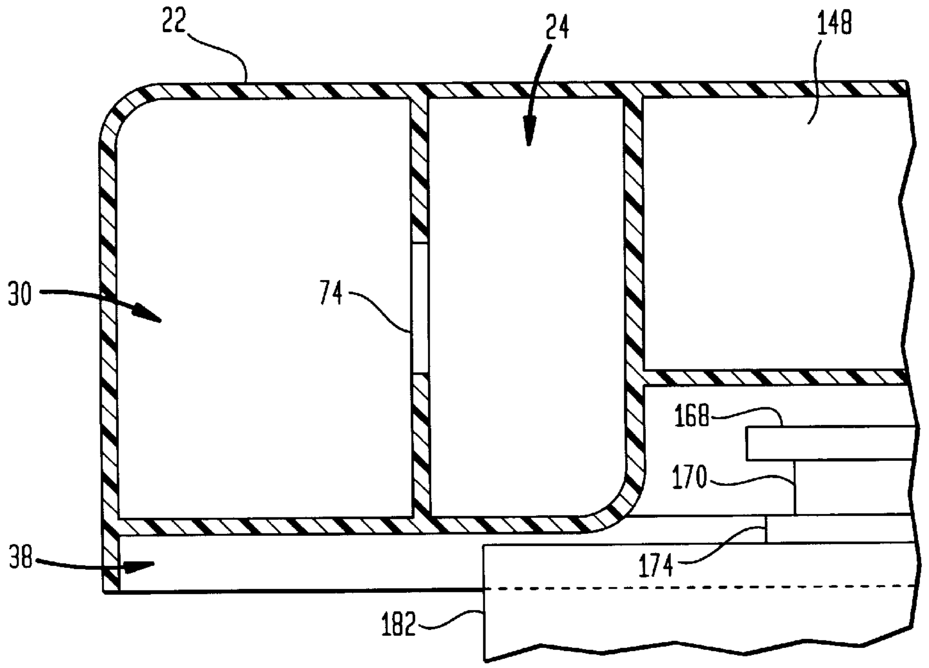
FIG. 5 is a fragmentary cross sectional view of the system of FIG. 1 along line 5—5 of FIG. 5.

A cavity or resonator 30 for holding raw air 62 and a resonator 32 are provided within the interior of housing 20. Referring to FIG. 4, resonators 30 and 32 are positioned adjacent to cavity 24. An intake or inlet (shown as an aperture 74 of resonator 30 and an aperture 76 of resonator 32) provide a passage for the ingress and egress of raw air 62 between cavity 24 and resonator 30 and cavity 24 and resonator 30 (see FIG. 5). Without wishing to be limited by theory, it is believed that noise (such as vibrations) generated from the engine and the induction of raw air into the air reservoir may be substantially reduced, dampened or muffled by bouncing or ricocheting against the boundaries of the resonators. According to an alternative embodiment, the intake of the resonator may be or horn-shaped (e.g., crimped, trumpet-shaped portion, curved, etc.). Not wishing to be limited by theory, it is believed that the horn shape of the intake of the resonator may provide an overall noise reduction by partially matching the natural frequency of the raw air and the engine to the natural frequency of the resonator. According to other alternative embodiments, the resonators may include a number of molded baffles or maze-like structures (which may be lined with a sound absorbent material as is known in the office furnishings art) into which the raw air is directed (i.e., the baffles may further serve to reduce the overall noise level of the engine and the induction of air into the air cavity).

A variety of accessories may be mounted to the interior or the exterior of housing 20. Referring to FIG. 4, cavity accessories 100 providing a reservoir or storage area for an item (such as a liquid) are shown mounted to the exterior of housing 20. A coolant reservoir (shown as a radiator overflow bottle 102) having a storage area 106 may be molded to or integral with housing 20. A cover 110 is provided on the top of bottle 102 to reduce the likelihood of items escaping from storage area 106 of bottle 102. A fastener 116 (e.g., threaded screw top, snap-on top, lid, etc.) may provide bottle 102 with a generally airtight seal. A solvent reservoir (shown as a windshield wiper fluid bottle 104) having a storage area 108 may be molded to or integral with housing 20. A cover 112 is provided on the top of bottle 104 to reduce the likelihood of items (such as windshield wiper fluid) from escaping storage area 108 of bottle 104. A fastener 114 (e.g., threaded screw top, snap top, lid, etc.) may provide a generally watertight seal to bottle 104. According to an alternative embodiment, a variety of mechanical accessories (e.g., radiator fan, windshield pump, air induction fan, etc.) may be mounted to the interior or the exterior of the housing. According to other alternative embodiments as shown in FIG. 4, any number of internal cavities may be provided within housing 20 such as a side cavity 176, a closure cavity 178, or a front cavity 148 to provide additional space or surface area for mounting accessories.

Referring to FIG. 3, a filter assembly 40 is disposed within filtering chamber 28 of cavity 24 and may be supported by a support structure such as a flange (not shown). Filter assembly 40 includes a generally circular-shaped air filter element (shown as a canister 42). A projection tube 118 of housing 20 fits within an aperture 128 of an upper end 52 of canister 42 to support filter assembly 40. (Projection tube 118 has a diameter less than the diameter of aperture 128 of canister 42.) Canister 42 includes an air receiving surface (shown as an outer wall 44) and an air-emitting surface (shown as an inner wall 46). Raw air 62 stored or induced in cavity 24 enters canister 42 through outer wall 44 and is directed through a filter media (not shown) such as a pretreated or pleated corrugated paper. During the purification or filtering of raw air 62 by canister 42, impurities (e.g., debris, particulates, gasses, dirt, pollution, etc.) may be entrapped within the filter media. Purified air 48 exits the filter media through inner wall 46 of canister 42. A covering (shown as an end cap 58) circumscribes and surrounds a lower end 50 of canister 42. End cap 58 promotes the entry of raw air 62 through outer wall 44 by covering or blocking lower end 58 of canister 42. A generally flexible, compressible seal 56 is mounted to upper end 52 of canister 42. Seal 56 extends radially around canister 42 beyond the periphery of aperture 128. A fastener (not shown), such as an adhesive or glue, may secure seal 56 to canister 42. Such fastener may also secure a left end of the filter media to a right end of the filter media to form a generally circular-shaped filter media. According to an alternative embodiment, the seal may be integrally molded to the filter element and/or the seal may be removably coupled to the filter element.

A twist lock system 120 (such as a bayonet mount) secures air filter assembly 40 in housing 20 such that canister 42 may be readily installed or removed from air filtering chamber 28. To secure or remove canister 42, a grip 124 of a cap 122 having molded projections or ears (shown as fingers 126) is rotated about 120 degrees relative to housing 20. Fingers 126 are spaced generally evenly about the periphery of cap 122. Cap 122 urges seal 56 of canister 42 against wall 22. Upon rotation of grip 124, fingers 126 of cap 122 are interconnected with wall 22 of housing 20. Such interconnection of fingers 126 and wall 22 maintain a compressive force between seal 56 and projection tube 118 to prevent raw air 62 from leading around seal 56. According to an alternative embodiment, an indexing system may be provided with the twist lock system to inhibit further rotation of the cap relative to the housing (i.e., such rotation may cause a disconnection between the fingers of the cap and the wall of the housing).

Referring to FIG. 1, engine 98 has a V-style configuration, such as a V-8 vehicular engine as is known in the automotive arts. Engine 98 includes a crankshaft (not shown) which, among other things, drives belt driven accessories 150. An manifold and throttle assembly 130 are positioned between a left cylinder bank 180 and a right cylinder bank 184 of engine 98. Throttle assembly 130 regulates the amount of purified air 48 directed from filter assembly 40 to a left valve cover 186 of left cylinder bank 180 and a right valve cover 188 of right cylinder bank 184. Throttle assembly 130 is generally coaxial with canister 42 of filter assembly 40. (According to a preferred embodiment as shown in FIG. 3, canister 42 and throttle valve 142 have axes parallel to the rotational axis of the crankshaft.) A fastener (shown as a capture clamp 82) connects throttle valve 142 of throttle assembly 130 to an extension tube 80 of housing 20. (The diameter of extension tube 80 is greater than the diameter of throttle valve 142, such that throttle valve 142 may be inserted into extension tube 80 and secured by capture clamp 82.) Throttle assembly 130 includes a choke assembly 134 providing a controller (shown as a lever 132) mounted to a generally semi-circular shaped cam 136. To regulate the amount of purified air 48 that passes through choke assembly 134, cam 136 rotates a shaft 138, which in turn rotates a flat throttle plate (shown as a flap 140) disposed within throttle valve 142. After passing through throttle assembly 130, purified air 48 is directed into valve covers 186 and 188 of engine 98. Throttle valve 142 may be Y-shaped so that a left outlet or discharge 146 of throttle valve 142 is mounted to left valve cover 186 and a right discharge (not shown) of throttle valve 142 is mounted to right valve cover 188, respectively. According to an alternative embodiment, the lever of the choke assembly may be controlled by a computer system.

Referring to FIG. 3, a channel 90 to direct air from left and right valve covers 186 and 188 to extension tube 80 may be mounted to housing 20. A positive crankshaft ventilation valve (shown as a PCV valve 92) may be disposed within channel 90 to regulate the ventilation of purified air 48 from valve covers 186 and 188 to throttle assembly 130. Channel 90 may also include a protrusion 94 for mounting housing 20 to valve covers 186 and 188. A grommet 190 may strengthen and protect a mounting portion 192 of valve covers 186 and 188. Thus, housing 20 may be removed with ease from engine 98 by disconnecting all mounting points (such as the mounting point between throttle assembly 130 and housing 20 and valve covers 186 and 188 and channel 90), all tubes (such as inlet 68) and lifting housing 20 away from the front of engine 98 and upwards over the top of engine 98.

Figure 6:
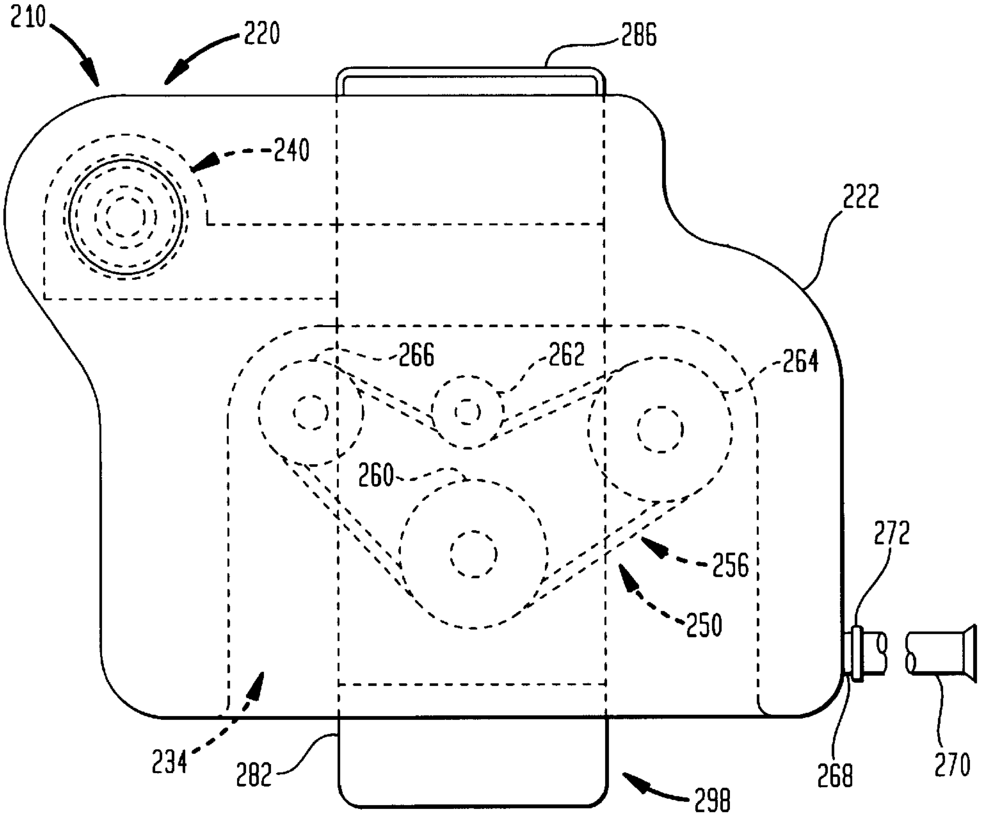
FIG. 6 is a front elevation view of a housing system in accordance with an alternative embodiment of the present invention.
Figure 7:
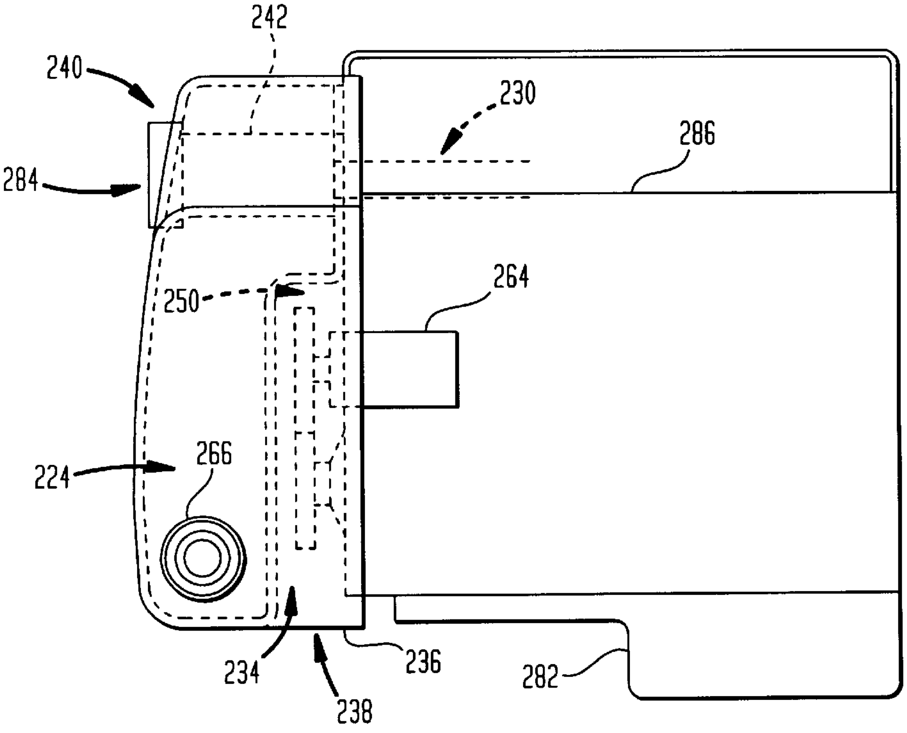
FIG. 7 is side elevation view of the system of FIG. 6.

A housing system 210, an alternative embodiment of system 10, is shown in FIG. 6. System 210 includes a housing 220 and an in-line style engine 298 (e.g., an in-line four cylinder engine as is known in the automotive arts). Housing 220 includes a shroud 238 having a peripheral wall 236 defining a recess cavity 234 (see FIG. 7). Recess cavity 234, similar to recess 34, surrounds belt driven accessories 250. An air induction cavity 224 is provided within housing 220. A fastener (shown as a capture clamp 272) attaches a dirty air tube 268 of housing 220 to an intake (shown as an inlet 270) of housing 220. Dirty air tube 268 is shown off center and on the side of housing 220, although the dirty air tube and the intake may be provided anywhere on the housing. A filter assembly 240 having a canister-style filter 242 secured by a twist lock mechanism 284 (similar to twist lock system 120 shown in FIG. 3) may be provided within housing 220. Engine 298, similar to engine 98, includes a throttle assembly 230 that connects a filter assembly 240 to a valve cover 286. A serpentine belt 256 interconnects a number of belt driven accessories (shown as an alternator 264, a crank 260, a water pump 262, and an idler 266). According to any alternative or preferred embodiments, the belt driven accessories may include air conditioning condensers, air pumps, power steering pumps, superchargers, etc.

According to a particularly preferred embodiment, the housing system purifies raw air before the raw air is routed to the valve cover of an automotive or vehicular engine. The housing is preferably constructed of injection-molded plastic. The peripheral wall of the housing preferably covers or surrounds the entire surface of the belt system and preferably at least a part of the belt driven accessories. The cover of the filter assembly is preferably constructed of aluminum and is encapsulated in urethane. The filter element holds about one quart of purified air and the filter media is preferably constructed of paper folded in a zigzag configuration. The seal of the filter assembly is preferably generally "V"-shaped and constructed of urethane rubber. Preferably, the covers of the cavity accessories are vibration welded to the storage area at about 120 hertz. The grip of the twist lock is molded plastic having a cross-type structure. Preferably, the grommet is constructed of rubber.

While a preferred embodiment of the invention is as described above, there are several substitutions that may be made without departing from the beneficial features of the above-described invention such as variations in sizes, structures, shapes and proportions of the various elements, values of parameters, mounting arrangements, or use of materials. For example, a mass air flow meter may be mounted between the air filter and the throttle assembly. In addition, the housing may be mounted to one or more of the valve covers, the engine block or the manifold.

According to other alternative embodiments, a variety of accessories may be associated with in the housing. Such accessories may be cavity accessories for storing or containing a variety of items such as liquid, spare parts, cleaning components, etc. Such cavity accessories may include a power steering fluid reservoir molded in the housing, a transmission fluid reservoir mounted to the exterior of the housing, a liquid overflow reservoir, etc. Further, the housing may include a compartment for supporting a battery. The accessories may also include a variety of mechanical accessories. The mechanical accessories may be provided in the housing (e.g., ignition system components and an engine control unit may be molded into the housing given any engine platform, and the engine control unit may be mounted in the housing, such that the airflow can function to cool the engine control unit). The mechanical accessories may be mounted to the exterior or the interior of the housing. Such mechanical accessories may include a fan mounted to the exterior of the housing for blowing air on a radiator, which may or may not be attached to the housing. Moreover, various sensors and solenoid mounting flanges (such as manifold temperature sensors and exhaust gas recirculation valves) can be molded or snapped to the housing. In addition, a charcoal canister for a canister purge solenoid may be mounted to the exterior of the housing.

According to other alternative embodiments associated with housing, the shape of the housing may be easily modified to conform to the style of the internal combustion engine (e.g., two and four cycle reciprocating piston engines, gas turbines, free piston, and rotary combustion type engines) and may be generally semi-circular shaped, bread-board shaped, angular shaped, etc. The underhood packaging or components (e.g., radiator, shock towers, cross members, belt driven accessories, etc.) may further influence the shape of the housing. The shroud may circumscribe and surround all of the belt driven accessories or a portions of individual belt driven accessories. A hole or space may be provided in the shroud such that the belt driven accessories may be accessible even when the housing is mounted to the engine. The shroud may abut the engine or may be spaced a distance from the engine.

According to other alternative embodiments associated with the filter assembly, the filter element may be disposable. The filter material may be constructed of a porous material (e.g., cardboard, corrugated paper, carbon block, etc.) or a natural or synthetic fibrous material (e.g., spun polyethylene, glass wool, microbial filter, etc.). The effective closure or seal between the filter assembly and the housing may be formed by any known connection system (such as a bayonet connector system, a threaded connection, a clamp, etc.) and may be maintained by any locking mechanism (e.g., a detent, a tumbler lock, a tacky adhesive, etc.). The seal of the filter assembly may be round-shaped, V-shaped, diamond-shaped or any other shape or configuration. The seal of the filter assembly may be mounted to the housing, fixed to a rigid or semi-rigid framework that also extends about the periphery of the filter element, or detached from both the housing and the filter element. The seal of the filter assembly may be positioned between the filter element and the housing. The filter may be a pan, box or drawer-style filter that is selectively removable from the housing.

It should be noted that the use of the term "channel" is not meant as a term of limitation, insofar as any valve, hose, tube, conduit, passage, passageway or like means or structure for providing a path through which air may flow is intended to be included in the term. It should also be noted that the use of the term "directed" is not meant as a term of limitation, insofar as any routing or leading of air into, through and out of the housing system is intended to be included in the term. It should also be noted that the use of the term "engine" is not meant as a term of limitation, insofar as any "engine" or like machine for using fuel and air to produce motion is intended to be included in the term.

Thus, it should be apparent that there has been provided in accordance with the present invention a housing system that fully satisfies the objectives and advantages as set forth above. Although the invention has been described in conjunction with specific embodiments thereof, it is evident that many alternatives, modifications and variations will be apparent to those skilled in the art. Accordingly, the invention is intended to embrace all such alternatives, modifications and variations that fall within the spirit and broad scope of the appended claims. Other substitutions, modifications, changes and omissions may be made in the design, operating conditions and arrangement of the preferred embodiments without departing from the spirit of the invention as expressed in the appended claims.

The embodiments of the invention in which an exclusive property or privilege is claimed are recited as follows:

1. A housing for abating noise and receiving an air cleaner, the housing configured for separable coupling to an internal combustion engine of an automobile, the engine having a plurality of belt driven accessories driven by a crankshaft, the housing comprising:

an internal air cavity disposed in the housing, the cavity providing an air induction chamber adjacent an intake for inducing air into the air induction chamber from an external source and a filtering chamber adjacent an air discharge for venting air from the filtering chamber, the filtering chamber configured to receive a filter for purifying air disposed intermediate the intake and the discharge; and a shroud integral with the exterior of the housing, the shroud providing a peripheral wall defining a recess configured to at least partially surround at least a portion of at least two belt driven accessories of the plurality of the belt driven accessories;

wherein the shroud substantially reduces noise generated by the engine.

2. The housing of claim 1, further comprising a resonator cavity for substantially reducing noise generated by the engine disposed in the housing adjacent a passage for inducing air into the resonance cavity, the passage being fluidly coupled to the air induction chamber.

3. The housing of claim 2, further comprising a lock fastener integral with the air discharge configured to selectively secure the filter in the filtering chamber.

4. The housing of claim 2, wherein the filtering chamber is configured to receive a generally panel-shaped filter.

5. The housing of claim 3, wherein the peripheral wall of the shroud is generally bread-board shaped having an open end providing access to the belt driven accessories.

6. The housing of claim 5, further comprising an inlet separable from the intake.

7. The housing of claim 6, wherein a cavity accessory is molded to the exterior of the housing.

8. The housing of claim 7, wherein the recess is configured to be generally transverse to the crankshaft of the engine.

9. The housing of claim 8, further comprising a plurality of resonator cavities for substantially reducing noise generated by the engine disposed in the housing adjacent a plurality of passages for inducing air into the plurality of resonance cavities, the plurality of passages being fluidly coupled to the air induction chamber.

10. An automotive power supply system, comprising:

an internal combustion engine including:

a throttle valve for regulating the amount of air provided to a valve cover and having a throttle intake, a throttle discharge and a throttle plate disposed between the throttle intake and the throttle discharge, the throttle discharge being intermediate the throttle intake and the valve cover;

a manifold for providing air from the throttle valve to the valve cover;

a hollow elongate member for venting air from the valve cover to the throttle valve disposed between the valve cover and a filter for purifying air;

a common fuel source for providing fuel to the manifold coupled to the manifold;

a radiator for cooling the engine coupled to the engine; and a plurality of belt driven accessories coupled to the engine and driven by a crankshaft; and a housing for abating engine noise and receiving the filter, the housing being mounted to the engine and including:

an internal air cavity disposed in the housing, the cavity providing an air induction chamber adjacent an air intake for inducing air into the air induction chamber from an external source and a filtering chamber adjacent an air discharge for venting air from the filtering chamber, the filter disposed in the filtering chamber intermediate the air intake and the air discharge; and a shroud integral with the exterior of the housing, the shroud providing a peripheral wall defining a recess at least partially surrounding at least a portion of at least two of the belt driven accessories of the plurality of belt driven accessories;

wherein the shroud substantially reduces noise generated by the engine and the air discharge of the air induction chamber is fluidly coupled to the throttle valve.

11. The system of claim 10, wherein the housing is constructed of plastic.

12. The system of claim 11, further comprising a mechanical accessory mounted to the housing.

13. The system of claim 12, further comprising a cavity accessory molded to the housing.

14. The system of claim 13, wherein the housing is coupled to the throttle valve and the valve cover.

15. The system of claim 14, wherein the peripheral wall of the shroud surrounds at least about 180 degrees of the plurality of belt driven accessories.

16. The system of claim 15, wherein the shroud and the plurality of resonators substantially muffle noise generated by the engine.

17. The system of claim 16, wherein the plurality of belt driven accessories further comprise at least a crank, a tension device, a water pump and an alternator.

18. The system of claim 17, further comprising a mass air flow meter intermediate the filter and the throttle discharge.

19. The system of claim 18, wherein a plurality of belts and a plurality of wheels of the plurality of belt driven accessories are disposed entirely within the recess.

20. The system of claim 19, wherein the cavity accessory contains a fluid and the mechanical accessory is a pump for dispersing the fluid in fluid communication with the cavity accessory.

* * * * *